US010282957B1

(12) United States Patent
Kirkbride

(10) Patent No.: US 10,282,957 B1
(45) Date of Patent: May 7, 2019

(54) OVERHEAT DETECTION SYSTEMS AND METHODS

(71) Applicant: THE BOEING COMPANY, Chicago, IL (US)

(72) Inventor: David W. Kirkbride, Allyn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/833,230

(22) Filed: Dec. 6, 2017

(51) Int. Cl.
G08B 17/12 (2006.01)
G01J 5/00 (2006.01)
G01J 5/04 (2006.01)
G01J 5/02 (2006.01)
B64D 45/00 (2006.01)

(52) U.S. Cl.
CPC ............ *G08B 17/12* (2013.01); *G01J 5/0018* (2013.01); *G01J 5/0275* (2013.01); *G01J 5/04* (2013.01); *B64D 2045/009* (2013.01)

(58) Field of Classification Search
None
See application file for complete search history.

(56) References Cited

U.S. PATENT DOCUMENTS

| | | | | |
|---|---|---|---|---|
| 4,749,280 A * | 6/1988 | Wolf | ........................ | A47J 27/62 219/448.13 |
| 5,059,953 A * | 10/1991 | Parsons | .................. | G08B 17/12 250/342 |
| 5,506,565 A * | 4/1996 | Andrew de Leon | .. | A01G 23/00 340/522 |
| 6,011,891 A * | 1/2000 | Katzir | ........................ | G01J 5/02 374/E13.003 |
| 6,241,386 B1 * | 6/2001 | Limburg | .............. | G01K 11/165 116/207 |
| 7,456,750 B2 * | 11/2008 | Popp | ....................... | A62C 3/002 269/61 |
| 7,828,478 B2 * | 11/2010 | Rege | ...................... | G01J 5/0022 250/338.1 |
| 8,457,796 B2 * | 6/2013 | Thind | .................... | G05B 15/02 236/47 |
| 9,308,404 B2 * | 4/2016 | Popp | ........................ | A62C 3/00 |

(Continued)

OTHER PUBLICATIONS

Chon et al. "Using RFID for Accurate Positioning" Journal of Global Positioning Systems; vol. 3, No. 1-2: 2004 (8 pages).

*Primary Examiner* — Curtis J King
(74) *Attorney, Agent, or Firm* — Philip S. Hof; The Small Patent Law Group

(57) ABSTRACT

A system for detecting an overheat condition in a confined space includes a sensing device and one or more processors. The sensing device is attached to a wall of the confined space. The sensing device includes a laser range sensor, a thermal imaging sensor, and a wireless communication circuit. The laser range sensor measures a distance from the sensing device to a target object within the confined space. The thermal imaging sensor measures thermal radiation emitted from the target object. The wireless communication circuit remotely communicates distance data representing the distance measured by the laser range sensor and radiation data representing the thermal radiation measured by the thermal imaging sensor. The one or more processors are configured to determine a temperature of the target object based on the distance data and the radiation data.

20 Claims, 5 Drawing Sheets

(56) References Cited

U.S. PATENT DOCUMENTS

| | | | | |
|---|---|---|---|---|
| 2003/0132847 A1* | 7/2003 | Anderson | G08B 17/125 | 340/578 |
| 2004/0051701 A1* | 3/2004 | Knowles | H03K 17/96 | 345/177 |
| 2007/0044979 A1* | 3/2007 | Popp | A62C 3/08 | 169/60 |
| 2007/0186677 A1* | 8/2007 | Zunino, III | G01L 1/148 | 73/849 |
| 2008/0106437 A1* | 5/2008 | Zhang | A62C 3/08 | 340/945 |
| 2008/0246598 A1* | 10/2008 | Brown | G06Q 10/06 | 340/517 |
| 2008/0246625 A1* | 10/2008 | Chen | G01J 5/0022 | 340/686.6 |
| 2008/0296513 A1* | 12/2008 | Ribi | G01J 1/50 | 250/474.1 |
| 2009/0294671 A1* | 12/2009 | Baghai | G01J 1/32 | 250/338.1 |
| 2010/0161016 A1* | 6/2010 | Augustine | A61F 7/0097 | 607/112 |
| 2011/0037571 A1* | 2/2011 | Johnson, Jr. | G06K 7/0095 | 340/10.5 |
| 2011/0037599 A1* | 2/2011 | Johnson, Jr. | H04W 4/043 | 340/632 |
| 2011/0074959 A1* | 3/2011 | Strandemar | G01J 5/025 | 348/164 |
| 2011/0215930 A1* | 9/2011 | Lee | G06K 9/00 | 340/573.1 |
| 2012/0012348 A1* | 1/2012 | Gracik | A62C 3/07 | 169/62 |
| 2012/0268604 A1* | 10/2012 | Tree | G08B 15/008 | 348/152 |
| 2012/0307046 A1* | 12/2012 | Lundberg | G01J 5/0022 | 348/135 |
| 2012/0318537 A1* | 12/2012 | Ransom, Jr. | A62C 3/08 | 169/46 |
| 2013/0120162 A1* | 5/2013 | Stehman | B64D 45/00 | 340/945 |
| 2013/0188058 A1* | 7/2013 | Nguyen | G01J 5/02 | 348/164 |
| 2013/0306335 A1* | 11/2013 | Petzinger | A62C 3/08 | 169/61 |
| 2014/0140368 A1* | 5/2014 | Yildizyan | G01J 5/0025 | 374/121 |
| 2014/0340222 A1* | 11/2014 | Thornton | G08B 7/062 | 340/539.17 |
| 2015/0053431 A1* | 2/2015 | Graham | A62C 3/08 | 169/61 |
| 2015/0336681 A1* | 11/2015 | Kern | B64D 45/00 | 340/945 |
| 2016/0096051 A1* | 4/2016 | Baker | A62C 3/08 | 169/46 |
| 2016/0104358 A1* | 4/2016 | Meier | B64D 45/00 | 340/628 |
| 2016/0158588 A1* | 6/2016 | Kirkbride | A62C 3/08 | 169/46 |
| 2016/0304326 A1* | 10/2016 | Shubel | B66C 17/00 | |
| 2017/0071536 A1* | 3/2017 | Tibbits | A61Q 1/025 | |
| 2017/0357330 A1* | 12/2017 | Lewis | G06F 3/042 | |
| 2018/0037268 A1* | 2/2018 | Moore | B62D 25/06 | |
| 2018/0089622 A1* | 3/2018 | Burch, V | G06K 7/1413 | |
| 2018/0253953 A1* | 9/2018 | Bucsa | G08B 17/12 | |

* cited by examiner

OVERHEAT DETECTION SYSTEMS AND METHODS

FIELD

Embodiments of the present disclosure generally relate to fire detection systems for detecting overheat conditions within confined spaces, such as spaces within aircrafts and other vehicles, industrial facilities, and the like.

BACKGROUND

Unintended fires are a concern in vehicles that carry cargo as fires may originate within the cargo. For example, batteries within cargo containers have been known to overheat, causing fires within the cargo bay of a vehicle. Known fire detection systems in vehicles include smoke detectors spread about the cargo bay, passenger cabin, and other fire-sensitive areas. But, the use of smoke detectors as a fire detection system within a vehicle has several disadvantages. For example, the smoke detectors may have a long detection time, representing the amount of time elapsed from the start of the fire to the time of detection. Transported cargo is typically held in covered containers. If a fire starts in one of the containers, the smoke may be trapped within the container, resulting in delayed detection of the fire. The smoke detectors can only detect the fire after the fire and smoke have penetrated the container. As a result of the delayed detection of the fire, the fire may grow larger and cause more damage than if the fire was detected earlier and the vehicle crew was notified.

Another disadvantage of the known smoke detector systems is the limited amount of information that is provided to the vehicle crew. Most known smoke detector systems only provide an alert that smoke is detected, and do not provide additional details about the fire, such as where the fire was detected within the cargo bay, the identity of the cargo container or containers on fire, the size of the fire, the temperature of the area around the fire, or the like. For example, a fire in a cargo container may be a small, submerged fire that is smoldering, or the fire may be a large fire that is emitting a substantial amount of heat and spreading. Since the crew is only provided with limited information that a fire is detected, the crew may take a remedial action that the crew would not have taken in the circumstances if more information had been available to the crew.

SUMMARY

A need exists for an effective fire and overheat detection system for confined spaces in vehicles, industrial facilities, and the like, that provides early detection of an overheat condition and provides the crew and/or operators with sufficient information about the detected overheat condition to enable an appropriate response in the circumstances.

Certain embodiments of the present disclosure provide a system for detecting an overheat condition in a confined space to address the needs described above and other needs. The system includes a sensing device and one or more processors. The sensing device is attached to a wall of the confined space. The sensing device includes a laser range sensor, a thermal imaging sensor, and a wireless communication circuit. The laser range sensor is configured to measure a distance from the sensing device to a target object within the confined space. The thermal imaging sensor is configured to measure thermal radiation emitted from the target object. The wireless communication circuit is configured to remotely communicate distance data representing the distance measured by the laser range sensor and radiation data representing the thermal radiation measured by the thermal imaging sensor. The one or more processors are configured to receive the distance data and the radiation data from the sensing device. The one or more processors are configured to determine a temperature of the target object based on the distance data and the radiation data.

Certain embodiments of the present disclosure provide a method for detecting an overheat condition in a confined space. The method includes remotely communicating distance data and radiation data from a sensing device attached to a wall of a confined space. The sensing device includes a laser range sensor and a thermal imaging sensor. The distance data represents a distance from the sensing device to a target object within the confined space as measured by the laser range sensor. The radiation data represents a thermal radiation emitted from the target object as measured by the thermal imaging sensor. The method includes determining, via one or more processors, a temperature of the target object based on the distance data and the radiation data measured by the sensing device. The method also includes initiating a remedial action responsive to determining that the temperature of the target object exceeds a threshold temperature associated with an overheat condition.

Certain embodiments of the present disclosure provide a sensing device. The sensing device includes a substrate, a thermal imaging sensor, a laser range sensor, and a wireless communication circuit. The substrate has a first side and an opposite second side. The second side is configured to be attached to a wall of a confined space. The first side faces towards a target object within the confined space. The thermal imaging sensor is mounted on the substrate and configured to measure radiation data representing thermal radiation emitted from the target object. The laser range sensor is mounted on the substrate and configured to measure distance data representing a distance of the target object from the sensing device. The wireless communication circuit is mounted on the substrate and configured to remotely communicate the distance data and the radiation data measured by the sensing device.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a system for detecting an overheat condition in a confined space. The term "overheat condition" refers to a high temperature that is beyond a typical, expected temperature range. An overheat condition may indicate the presence or a threat of fire. For example, the term "overheat condition" as used herein refers broadly to all stages of combustion, including pre-ignition, high temperature conditions, ignition, burn, suppression, containment, extinguishment, and re-ignition.

The overheat detection system is configured to monitor the temperature of one or more target objects within the confined space. The target objects may be any objects that pose a threat for overheating and/or igniting, such as cargo containers, wheel assemblies, combustion engines, or industrial machinery, and the like. An operator may place sensing devices of the system on one or more walls of the confined space. Embodiments of the overheat detection system described herein are configured to accurately monitor the temperature of the target objects regardless of the proximity of each target object to the sensing devices of the system. The distance from a target object to a sensing device affects the intensity of thermal infrared (IR) radiation that impinges upon the sensing device. A sensor that does not compensate for the distance from the sensor to the radiation-emitting object may inaccurately measure the temperature of the object and/or the amount of heat radiating from the object. In certain applications, such as within an aircraft cargo bay, the arrangements of the cargo containers may differ for different trips depending on the amount and type of cargo. The embodiments of the overheat detection system described herein, when installed in an aircraft cargo bay, are configured to accommodate different cargo container loading arrangements automatically without adjusting the positions of the sensing devices or manually inputting container-location information into the system.

Figure 1:
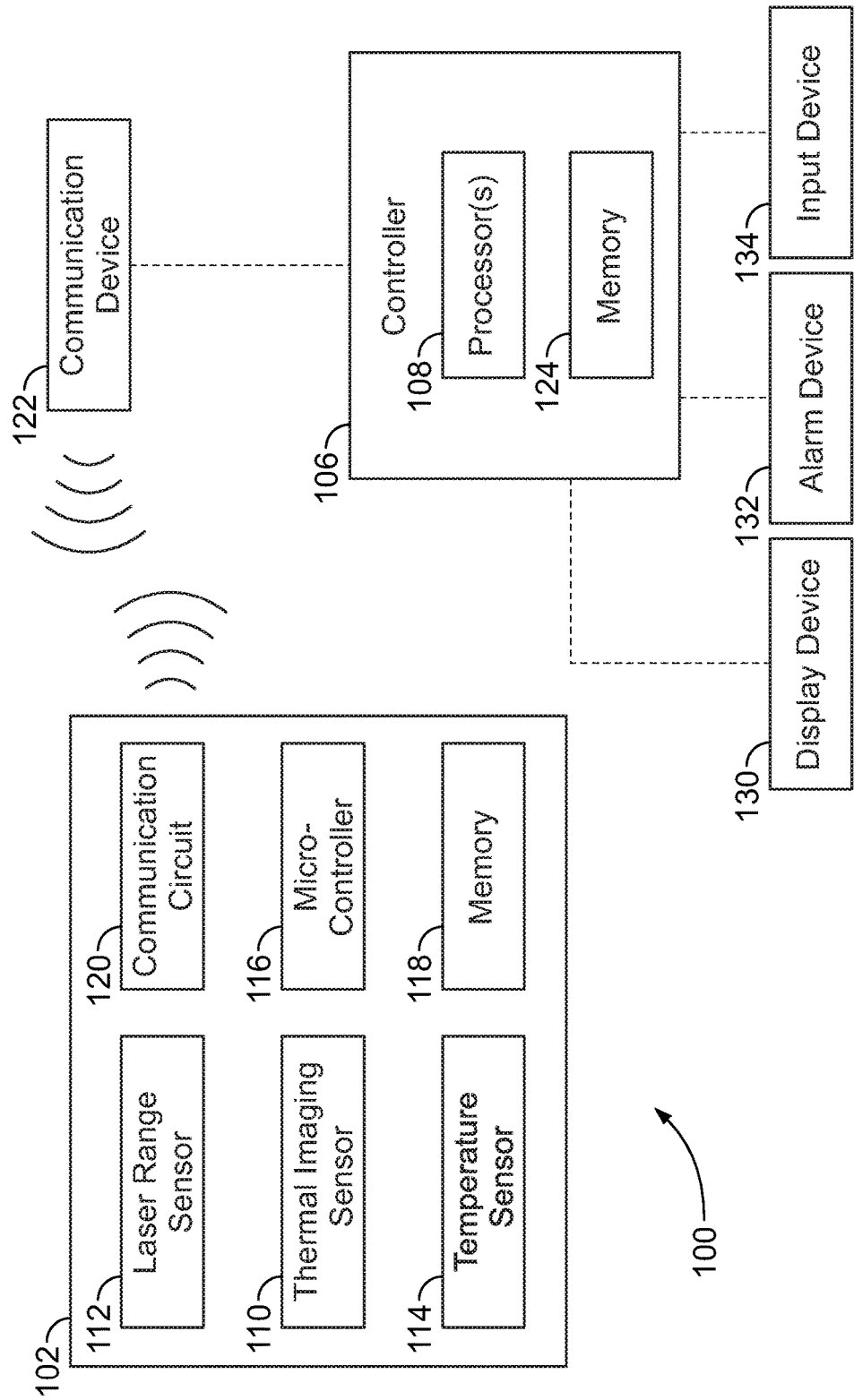
FIG. 1 illustrates a block diagram of an overheat detection system according to an embodiment.

FIG. 1 illustrates a block diagram of an overheat detection system 100 according to an embodiment. The overheat detection system 100 includes a sensing device 102 and a controller 106 including, or represented by, one or more processors 108. The block diagram shown in FIG. 1 shows a non-limiting example embodiment of the overheat detection system 100. The overheat detection system 100 in other embodiments may include fewer components, additional components, and/or different components than the components illustrated in FIG. 1.

The sensing device 102 includes various sensors and circuitry. For example, the sensing device 102 in the illustrated embodiment includes a thermal imaging sensor 110, a laser range sensor 112, and a temperature sensor 114. The thermal imaging sensor 110 is configured to measure thermal radiation emitted from a target object. The thermal radiation measured by the thermal imaging sensor 110 includes infrared (IR) light and optionally also includes visible light. The thermal imaging sensor 110 may include components and circuitry of a thermographic camera, and may include or represent a bolometer.

The laser range sensor 112 is configured to measure a distance from the sensing device 102 to a target object in a path of the laser range sensor 112 within a confined space. The laser range sensor 112 uses a laser beam to determine the distance to the target object based on the time of flight of the laser beam before the beam reflects back to the sensor 112. The laser range sensor 112 may be configured to measure distances in a range from a few centimeters to tens of meters. Although a laser beam is transmitted in one embodiment, in other embodiments different types of electromagnetic fields or beams may be transmitted and used for measuring the distance, such as ultrasonic waves, radar, and the like. In an embodiment, the laser range sensor 112 and the thermal imaging sensor 110 are oriented in a common angle and share a common field of view. For example, the laser range sensor 112 may be co-aligned with the thermal imaging sensor 110. The target object to which the laser range sensor 112 measures the distance is the same target object that the thermal imaging sensor 110 measures for emitted thermal radiation. The laser range sensor 112 may be, in one or more embodiments for example, an infrared laser dot target designator range sensor (e.g., a focal dot designator).

The temperature sensor 114 is configured to measure a reference ambient temperature source target within the ambient environment of the sensing device 102. For example, the sensing device 102 is configured to be placed in a confined space, and the temperature sensor 114 measures an ambient temperature within the confined space, at least along the surface of the sensing device 102 where the temperature sensor 114 is located. The temperature sensor 114 may be a thermocouple, thermistor, or the like. The ambient temperature measured by the temperature sensor 114 may be used to calibrate the thermal imaging sensor 110 and/or provide temperature correction of the thermal imaging sensor 110. For example, the temperature sensor 114 may provide a baseline temperature that is used in conjunction with a calculated temperature of the target object by the thermal imaging sensor 110 to compare the temperature of the target object relative to the ambient environment.

The sensing device 102 also includes a micro-controller 116 and a local memory 118. The micro-controller 116 may include one or more processors configured to control operation of the sensors 110, 112, 114. The memory 118 may include one or more volatile and/or non-volatile memory devices, such as random access memory (RAM), static random access memory (SRAM), dynamic RAM (DRAM), another type of RAM, read only memory (ROM), flash memory, or the like. The memory 118 may be configured to store, at least temporarily, data measured by the sensors 110, 112, 114. For example, the memory 118 may store distance data representing the distance measured by the laser range sensor 112, thermal radiation (e.g., heat) data measured by the thermal imaging sensor 110, and ambient temperature data measured by the temperature sensor 114.

The sensing device 102 also includes a wireless communication circuit 120 that is configured to remotely wirelessly communicate (e.g., transmit and/or broadcast) the data measured by the onboard sensors 110, 112, and 114. The wireless communication circuit 120 includes an antenna and associated circuitry for generating wireless signals. The micro-controller 116 may control the operation of the wireless communication circuit 120. For example, the micro-controller 116 may retrieve the various types of data from the memory 118 and package the data into data packets that are remotely communicated by the wireless communication circuit 120. The micro-controller 116 may operate based on programmed instructions (e.g., software) that are stored in the memory 118 or another non-transitory computer-readable storage medium.

The wireless communication circuit 120 may be based on peer-to-peer (P2P) distributed data network technology to establish multiple sensor locations and transmit data to provide real-time thermographic volume mapping of a designated volume. The wireless communication circuit 120 may be configured to communicate with other sensing devices 102 within a shared space to determine the relative locations of the wireless communication circuit 120 and the other sensing devices 102 within the space via collective sensor fusion (as described in more detail herein with reference to FIG. 6).

The wireless signals from the wireless communication circuit 120 may be received by a communication device 122 that is remote from the sensing device 102. As used herein, the term "remote" refers to a physical separation between two components of any distance. For example, the communication device 122 may be spaced apart from the sensing device 102 by one or more meters, or less, within the same confined space as the sensing device 102. Alternatively, the communication device 122 may be located outside of the confined space. The communication device 122 is operatively connected to the controller 106, and is configured to convey the measurement data (e.g., distance data, radiation data, temperature data, etc.) received from the sensing device 102 to the controller 106 via a wired or wireless communication pathway.

In one or more embodiments, the wireless communication circuit 120 is a radio-frequency identification (RFID) tag 120, and the communication device 122 is an RFID reader 122. The RFID reader 122 interrogates the RFID tag 120 to receive the measurement data from the sensing device 102. Optionally, the RFID tag 120 may include the micro-controller 116 and the memory 118 in addition the wireless communication circuit 120. In an embodiment, the RFID tag 120 is a passive RFID tag that is powered by electrical energy received from the RFID reader 122. For example, the RFID reader 122 is configured to wirelessly communicate (e.g., broadcast or transmit) an electrical activation signal that is received by the RFID tag 120. The electrical activation signal energizes the circuitry of the RFID tag 120, enabling the RFID tag 120 to generate a data signal including the measurement data and communicate the data signal remotely to the RFID reader 122. Optionally, the sensing device 102 includes no onboard power source, and all functions are powered by the electrical energy received in the electrical activation signal. For example, the sensors 110, 112, 114 may be powered by the electrical activation signal, such that the sensors 110, 112, 114 collect the respective measurements upon receipt of an electrical activation signal. Alternatively, the sensing device 102 may include one or more onboard inductors, capacitors, batteries, or the like, that are configured to store some of the electrical energy received from the electrical activation signal.

In one or more alternative embodiments, instead of using RFID technology, the wireless communication circuit 120 may communicate with the communication device 122 using another wireless communication protocol, such as the Bluetooth® technology standard, the Zigbee® technology standard, or the like.

The controller 106 includes one or more processors 108 and a non-transitory, computer-readable storage medium, or memory 124, that perform various functions described herein. Each of the one or more processors 108 may include a microprocessor, controller, or equivalent control circuitry. The memory 124 may include or represent a physical device that stores data on a temporary or permanent basis for use by the processor 108. The memory 124 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory 124 may store programmed instructions (e.g., software) that dictate the functions of the processors 108.

As described herein in more detail, the one or more processors 108 are configured to receive the measurement data collected from the sensing device 102 and any additional sensing devices 102 (shown in FIG. 6) that are identical, or at least similar, to the sensing device 102. The one or more processors 108 may receive the measurement data from the communication device 122 or directly from the one or more sensing devices 102. The one or more processors 108 analyze the measurement data to determine a temperature of the target object. For example, the temperature of the target object is determined based at least on the radiation data and the distance data measured by the sensing device(s) 102. The one or more processors 108 may detect an overheat condition if the temperature of the target object is determined to exceed a designated threshold temperature.

In at least one embodiment, the sensing device 102 is one of multiple identical sensing devices 102 within a confined space. Each of multiple sensing devices 102 may measure a particular corresponding portion of the target object, such that the sensing devices 102 do not all measure the same portion of the target object. The portions of the target object that are measured by different sensing devices 102 may overlap. The measurement data received from multiple sensing devices 102 may be tagged to the collecting sensing device 102 such that the one or more processors 108 can determine the source and location of the data. The one or more processors 108 may be configured to determine a particular portion of the target object that has an overheat condition. Optionally, at least some of the sensing devices 102 may be configured to measure a different target object of multiple target objects in the confined space that are monitored by the overheat detection system 100. In such a scenario, the tagged measurement data may be used by the one or more processors 108 to determine which of the multiple target objects has an overheat condition.

The controller 106 may be operatively connected (e.g., via a wired or wireless communication pathway) to various devices, including a display device 130, an alarm device 132, and an input device 134. The display device 130 may be a monitor, a touchscreen display, or the like, and may be a standalone device or an integrated component of a computer, tablet, an instrument panel, a smartphone, or the like.

In an embodiment, the one or more processors 108 may be configured to display a graphic about the target object in the confined area to an operator that views the display device 130. For example, the graphic may be a three-dimensional spatial heat map of the confined area showing any detected hot spots that may indicate a fire or at least an overheat condition. The alarm device 132 may be a visual, audio, and/or tactile device, such as a stereo speaker, a light, a vibrating device, or the like. The one or more processors 132 may activate the alarm device 132 automatically upon detection of the overheat condition to notify the operators (e.g., crew) of the overheat condition. The input device 134 may be a microphone, a keyboard, a touchpad, a mouse, buttons, and/or the like. The input device 134 may be utilized by an operator to provide information to the controller 106, to control the operation of the system 100, to turn on and off the system 100, and/or the like. The devices 130, 132, 134 shown in FIG. 1 are merely example devices, and the controller 106 may be operatively connected to additional devices, fewer devices, and/or different devices in other embodiments.

Figure 2:
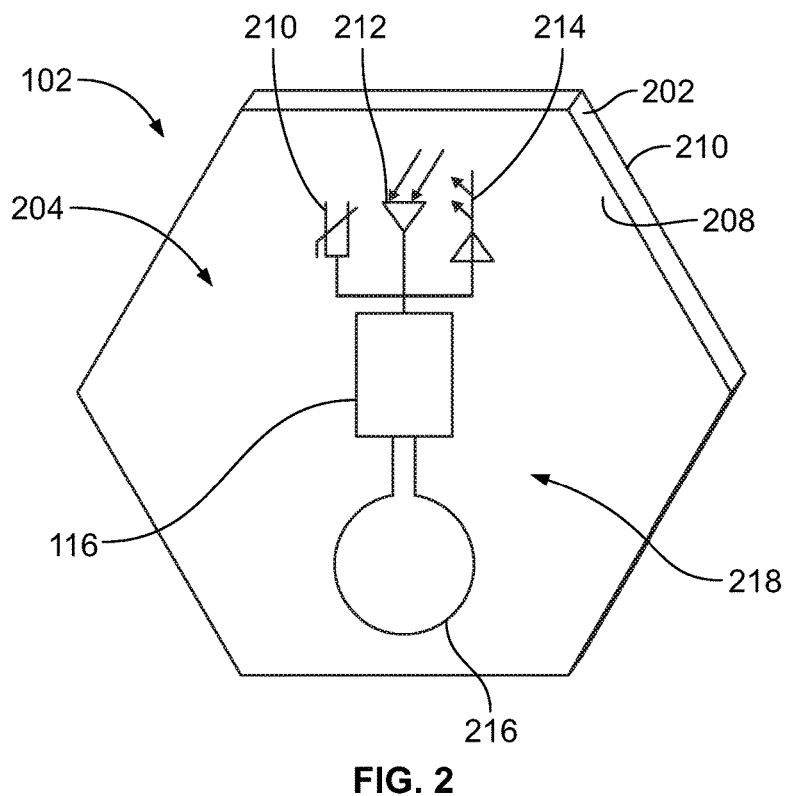
FIG. 2 is a perspective illustration of a sensing device of the overheat detection system according to an embodiment.

FIG. 2 is a perspective illustration of the sensing device 102 according to an embodiment. The sensing device 102 includes a substrate 202 and circuitry 204 mounted on the substrate 202. The substrate 202 has a first side 206 and a second side 208 that is opposite the first side 206. The circuitry 204 may be printed on the first side 206. The second side 208 is configured to be attached to a wall of a confined space. For example, the second side 208 may be attached to the wall via the use of removable fasteners, such as hook-and-loop touch fasteners (e.g., Velcro® brand), snaps, pins, clips, staples, nails, or the like. Alternatively, the sensing device 102 may be attached to the wall via an adhesive, such as an epoxy, tape, or the like, that is applied on the second side 208. In an embodiment, the substrate 202 is thin and relatively flexible. As used herein, the sensing device 102 is also referred to as a decal, as the sensing device 102 is thin, flexible, and configured to be secured to a wall. In an embodiment, the sensing device 102 is removably attached to the wall, which allows for selectively changing the placement of the sensing device 102 within the confined space based on the location, size, number, and type of target object. For example, an operator can move a position of the sensing device 102 to better align with a new target object to monitor.

The substrate 202 may include a heat-resistant, fiber-based fabric and a resin. Some non-limiting examples of the substrate 202 material include fiberglass, carbon fiber, Kevlar®, and the like. The material of the substrate 202 may be heat-treated to withstand high temperatures without damaging the sensitive circuitry 204. For example, the circuitry 204 may be coated in a heat-resistant resin layer of glass, resin, paint, or the like, along the first side 206 of the sensing device 102.

In the illustrated embodiment, the substrate 202 has a hexagonal shape, which allows the sensing device 102 to be located and tiled along the wall with other identical sensing devices 102 (shown in FIG. 6), such as to provide desirable or required sensor coverage. The substrate 202 may have a broad range of possible sizes. In an embodiment, the substrate 202 has a diameter (between opposite linear sides) between about 10 cm and about 100 cm, but the substrate 202 may be smaller or larger than that range in other embodiments. The thickness of the substrate 202 between the first and second sides 206, 208 in an embodiment may be between about 0.2 cm and about 5 cm. The sensing device 102 may have different shapes and/or sizes in other embodiments.

The circuitry 204 shown in FIG. 2 includes a first circuit component 210 representing the temperature sensor 114 (shown in FIG. 1), a second circuit component 212 representing the thermal imaging sensor 110 (FIG. 1), a third circuit component 214 representing the laser range sensor 112 (FIG. 1), and an antenna 216 representing the wireless communication device 120 (FIG. 1). The circuitry 204 also includes the micro-controller 116 disposed between the antenna 216 and the circuit components 210, 212, 214. The micro-controller 116 and the antenna 216 may represent components of a passive, active, or hybrid RFID tag 218.

Figure 3:
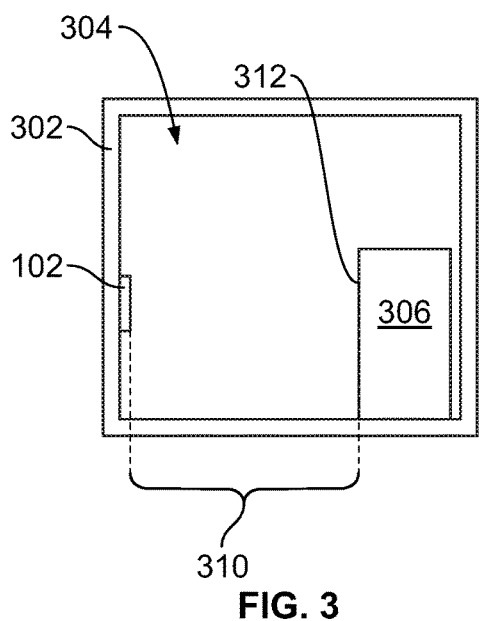
FIG. 3 is a diagram showing the sensing device of the overheat detection unit mounted to a wall that defines a portion of a confined space according to an embodiment.
Figure 4:
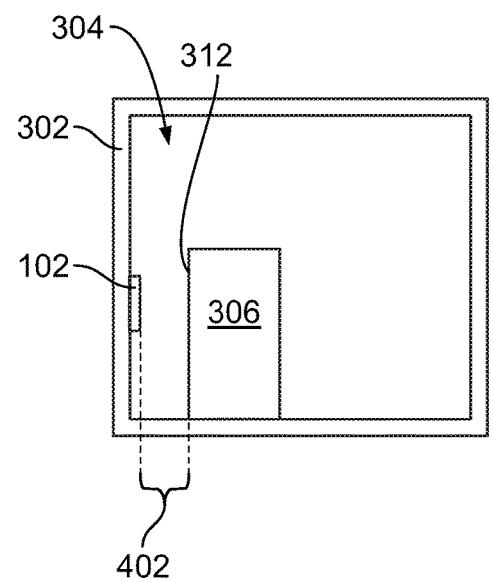
FIG. 4 is a diagram showing the sensing device in the confined space of FIG. 3 with an object in the confined space located in a different position relative to the position of the object shown in FIG. 3.

FIG. 3 is a diagram showing the sensing device 102 of the overheat detection unit (shown in FIG. 1) mounted to a wall 302 that defines a portion of a confined space 304 according to an embodiment. An object 306 is disposed within the confined space 304. The object 306 is a target object that is configured to be monitored by the sensing device 102 to detect an overheat condition of the object 306. FIG. 4 is a diagram showing the sensing device 102 in the same confined space 304 of FIG. 3 with the object 306 in the confined space 304 located in a different position relative to the position of the object 306 shown in FIG. 3.

Referring to FIG. 3, the sensing device 102 is configured to measure the distance 310 from the sensing device 102 to the target object 306 using the laser range sensor 112 (shown in FIG. 1). The distance 310 extends from the sensing device 102 to a side 312 of the target object 306 that faces towards the wall 302. The sensing device 102 is also configured to measure thermal radiation, such as IR radiation, emitted from the target object 306 along the side 312 using the thermal imaging sensor 110 (FIG. 1). The temperature sensor 114 (FIG. 1) on the sensing device 102 measures an ambient temperature at the sensing device 102.

Referring now to FIG. 4, the sensing device 102 measures a distance 402 between the sensing device 102 and the side 312 of the target object 306. The distance 402 is less than the distance 310 shown in FIG. 3. The distance 402 may be several orders of magnitude less than the distance 310. For example, the distance 310 in FIG. 3 may be five meters, and the distance 402 in FIG. 4 may be five centimeters. The different locations of the target object 306 in FIGS. 3 and 4 may represent different loading arrangements of a cargo area of a vehicle. For example, the target object 306 may be disposed closer to the sensing device 102 in FIG. 4 due to a tighter packing of cargo within the cargo area in FIG. 4 than in the loading arrangement of FIG. 3.

In an embodiment, the target focal plane may be at any distance from two inches to several meters from the sensing device 102. The laser range sensor 112 (FIG. 1) provides the distance from the sensing device 102 to the target focal plane. This distance may be combined with the spatial location of the sensing device 102 determined from triangulating the wireless locations of the sensing device 102 and other sensing devices 102 (not shown) within the confined space 304 to generate a focal plane spatial location of the centroid for the thermal image data provided by the thermal imaging sensor 110 (FIG. 1).

The controller 106 (shown in FIG. 1), including the one or more processors 108 (FIG. 1), is configured to determine a temperature and/or other thermal-related information about the target object 306 based on the data received from the sensing device 102. For example, the controller 106 may be configured to determine a temperature of the side 312 of the target object 306, which can be used to detect an overheat condition of the target object 306. Although not shown in FIG. 3, other sensing devices 102 (shown in FIG. 6) disposed at different locations within the confined space 304 may be used to determine the temperature of portions of the target object 306 other than the side 312.

The controller 106 may calculate the temperature of the side 312 of the target object 306 based on an algorithm that is a function of the radiation data, the emissivity of the target object 306, and the distance data received from the sensing device 102. For example, the intensity of the IR radiation emitted from the target object 306 measured by the thermal imaging sensor 110 (FIG. 1) is inversely proportional to the square of the distance between the sensing device 102 and the target object 306 measured by the laser range sensor 112 (FIG. 1). Referring to FIGS. 3 and 4, if the amount of IR radiation emitted from the side 312 of the target object 306 is the same in both FIGS. 3 and 4, the thermal imaging sensor 110 measures a greater amount of IR radiation in FIG. 4 than in FIG. 3 due to the closer proximity of the target object 306 in FIG. 4. The controller 106 is configured to compensate for the distance to the target object 306 when calculating the temperature of the target object 306. For example, although the thermal imaging sensor 110 measures a greater amount of IR radiation in FIG. 4 than in FIG. 3, the algorithm used by the controller 106 accounts for the distance measurements by the laser range sensor 112 to output calculated temperatures for the side 312 of the target object 306 that are equal or approximately equal (e.g., within 1%, 2%, or 3% of each other).

In an embodiment, the controller 106 (e.g., the one or more processors 108 thereof) may calculate the temperature of the target object 306 based on additional information other than the distance data and IR radiation data. For example, various material constants may be input into the controller 106, such as by an operator using the input device 134. One such material constant may be the emissivity value of the side 312 of the target object 306, which generally represents the effectiveness of the material at emitting thermal energy. Certain materials, such as glass, have higher emissivity values than other materials, such as aluminum foil, and therefore are more effective at emitting thermal energy. For example, although the thermal imaging sensor 110 of the sensing device 102 may measure a similar amount of IR radiation emitted from a glass surface of a first target object and an aluminum foil surface of a second target object, the different emissivity values of the materials indicate that the temperature within the aluminum foil target object may be greater than the temperature within the glass target object (e.g., aluminum foil emits thermal energy less efficiently than glass).

The controller 106 also may use the ambient temperature measured by the temperature sensor 114 (FIG. 1) of the sensing device 102 as a factor when detecting the overheat condition of the target object 306. The ambient temperature value may be utilized as a baseline or reference temperature. The ambient temperature information may allow the controller 106 to discount or disregard thermal energy that is attributable to the ambient environment instead of the target object 306. For example, the controller 106 may factor the ambient temperature measurement into the calculation of the temperature of the target object 306. For example, the controller 106 may adjust the calculated temperature of the target object 306 upwards if the ambient temperature is cold, such as below zero degrees Celsius, and may adjust the calculated temperature of the target object 306 downwards if the ambient temperature is warm or hot, such as above 35 degrees Celsius. Adjusting the temperature upwards in cold conditions accounts for heat lost by the target object 306 to the environment, and adjusting the temperature downwards in hot conditions accounts for heat from the environment absorbed by the target object 306.

Alternatively, instead of adjusting the calculated temperature of the target object 306, the controller 106 may use the ambient temperature measurement to adjust the designated threshold temperature value indicative of an overheat condition. For example, at room temperature (e.g., about 25 degrees Celsius (C)), the designated threshold temperature may be set to a first value, such as 50 degrees C. In cold conditions below zero degrees C., the threshold may be reduced below 50 degrees C. an extent that is proportionate to the severity of the cold ambient temperature. Inversely, in hot ambient conditions above 35 degrees C., the threshold may be increased above 50 degrees C. an extent that is proportionate to the severity of the hot ambient temperature.

Figure 5:
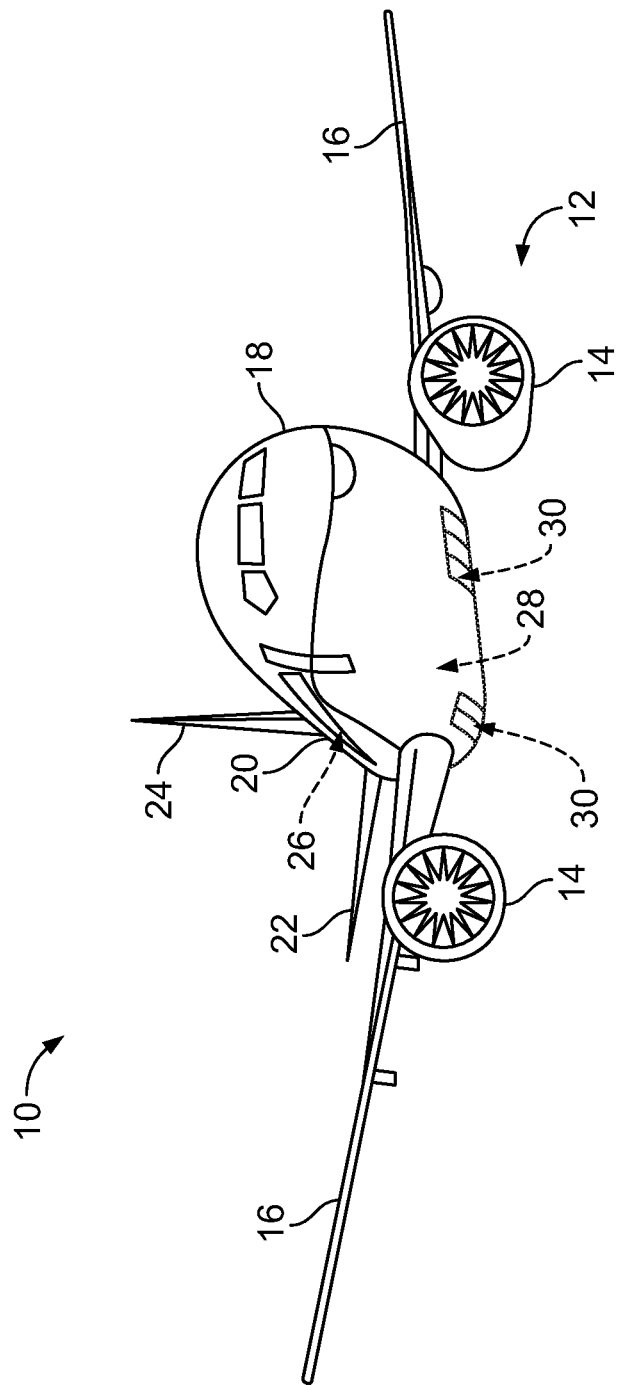
FIG. 5 illustrates a front perspective view of an aircraft according to an embodiment of the present disclosure.

FIG. 5 illustrates a front perspective view of an aircraft 10 according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an interior cabin 26, a cargo bay 28, and multiple wheel wells 30. The wheel wells 30 hold the landing gears when the landing gears are in a retracted state, as shown in FIG. 3. The cargo bay 28 holds cargo, such as luggage and large cargo containers. The passengers and crew occupy the interior cabin 26. The cargo bay 28 is below the interior cabin 26. Optionally, the cargo bay 28 may extend continuously for the length of the fuselage 18, may be divided into at least two sections, or may extend only a portion of the length of the fuselage 18. The interior cabin 26, the cargo bay 28, and the wheel wells 30 may all represent confined spaces that are vulnerable to fire. The overheat detection system 100 (shown in FIG. 1) may be installed within the interior cabin 26, the cargo bay 28, and/or one or more of the wheel wells 30. Optionally, instead of an aircraft, embodiments of the overheat detection system 100 may be installed in various other vehicles (e.g., automobiles, buses, locomotives and train cars, sea craft, and spacecraft), in industrial facilities, or the like.

Figure 6:
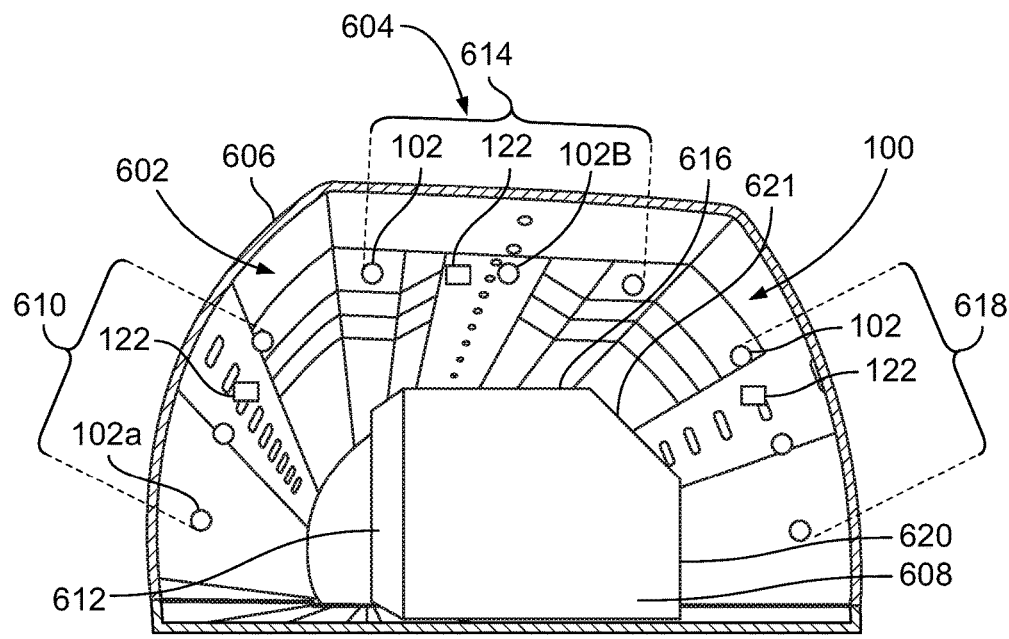
FIG. 6 is a perspective view of the overheat detection system installed within a cargo area of a vehicle according to an embodiment.

FIG. 6 is a perspective view of the overheat detection system 100 installed within a cargo area 602 of a vehicle 604 according to an embodiment. The cargo area 602 may be the cargo bay 28 of the aircraft 10 shown in FIG. 5. The overheat detection system 100 includes a plurality of the sensing devices 102 and multiple communication devices 122. The controller 106 (FIG. 1) is not shown in FIG. 6. For example, the controller 106 may be located remote from the cargo area 602, such as in a cockpit of the vehicle 604 or at a control center offboard the vehicle 604. In the illustrated embodiment, the sensing devices 102 include RFID tags, and the communication devices 122 are RFID readers (and are referred to as "RFID readers 122").

In the illustrated embodiment, the sensing devices 102 are attached to walls of a cargo liner 606 within the cargo area 602. The cargo liner 606 may be a heat-resistant shield that thermally isolates the cargo area 602 from other areas of the vehicle 604, such as passenger and crew areas. The sensing devices 102 are spaced apart along an inner perimeter of the cargo liner 606. The sensing devices 102 are positioned to generally surround a cargo container 608 within the cargo area 602. The container 608 is a target object that is monitored by the sensing devices 102 for detecting an overheat condition of the container 608. Although only one container 608 is shown, the cargo area 602 may hold multiple containers, and the overheat detection system 100 may monitor a plurality of the containers to detect an overheat condition in any of the containers.

The sensing devices 102 may be positioned to monitor different portions of the container 608. For example, a first group 610 of the sensing devices 102 monitors the heat emitted from a first side 612 of the container 608, a second group 614 of the sensing devices 102 monitors the heat emitted from a top side 616 of the container 608, and a third group 618 of the sensing devices 102 monitors the heat emitted from a second side 620 of the container 608 that is opposite the first side 612. The top side 616 is between the first and second sides 612, 620. The sides 612, 616, 620 of the container 608 may be linear, curved, or have different shapes. For example, the first side 612 is linear in the illustrated embodiment, and the corner between the top side 616 and the second side 620 has a beveled surface 621 which may be considered part of the top side 616 and/or the second side 620.

In an embodiment, the positions or locations of the sensing devices 102 are determined by the overheat detection system 100. The positions may be absolute positions based on global positioning coordinates or relative positions based on proximity to each other, the RFID readers 122, and/or parts of the vehicle 604. In an embodiment, the sensing devices 102 are removably attached to the liner 606, which allows an operator to selectively position the sensing devices 102 relative to one or more target objects within the cargo area 602.

Upon mounting the sensing devices 102, the overheat detection system 100 may be configured to automatically determine the positions of the sensing devices 102. The spatial location of the sensing devices 102 (and the sensors thereof) within the cargo area 602 may be known relative to each other via sensor fusion. The term sensor fusion may refer to a process by which data from several different sensors are "fused" to compute something beyond the limitations of any one sensor or sensing device alone. For example, the wireless communication circuits 120 (FIG. 1) of the sensing devices 102 may communicate with each other and/or with the RFID readers 122 (or other communication devices) in the cargo area 602 to calculate the positions of the sensing devices 102.

In one or more embodiments, the RFID readers 122 may determine the positions of the sensing devices 102 using trilateration or another algorithm that calculates the positions of the sensing devices 102 relative to the RFID readers 122. The RFID readers 122 may use trilateration by broadcasting electrical activation signals and determining the amount of time before receiving a response signal from each of the sensing devices 102. The response signals communicated by the sensing devices 102 may include identifiers that indicate the particular sensing device 102 communicating the response signal. Using this information, the overheat detection system 100 can automatically determine the positions of each of the sensing devices 102 within the cargo area 602. Alternatively, the sensing devices 102 may include integrated location-determining circuitry (e.g., GPS systems) that are used to determine absolute positions of the sensing devices 102. In an alternative embodiment, an operator may manually input the positions of the sensing devices 102 into the controller 106 of the system 100 using the input device 134 (FIG. 1), such as by selecting the positions of the sensing devices 102 in a virtual graphic showing the cargo bay 602.

The measurement data communicated by the sensing devices 102, including distance data, radiation data, temperature data, and the like, may be tagged to the particular sensing device 102 that collected the corresponding data. For example, each data signal communicated by the sensing devices 102 may include a unique identifier that identifies the sensing device 102 that collected the data. The controller 106 may be configured to associate the data with the sensing device 102 based on the unique identifier. As described above, the positions of the sensing devices 102 may be known, so the overheat detection system 100 may be configured to associate the measurement data with different locations in the cargo bay 602 and different portions of the container 608. For example, based on measurement data received from a first sensing device 102A that is positioned to monitor the first side 612 of the container 608, the controller 106 may calculate a temperature of the first side 612 of the container 608. Furthermore, based on measurement data received from a second sensing device 102B that is positioned to monitor the top side 616 of the container 608, the controller 106 may calculate a temperature of the top side 616 of the container 608. Using such positional information, the overheat detection system 100 can provide additional information beyond merely indicating the presence of an overheat condition, such as the location of hot spots within the container 608. In addition, when the overheat detection system 100 is used to monitor multiple target objects, the positional information can be used to determine which of the target objects is experiencing an overheat condition. The controller 106 may also use the positional data to generate a heat map that shows calculated temperatures at different locations within the cargo area 602.

Figure 7:
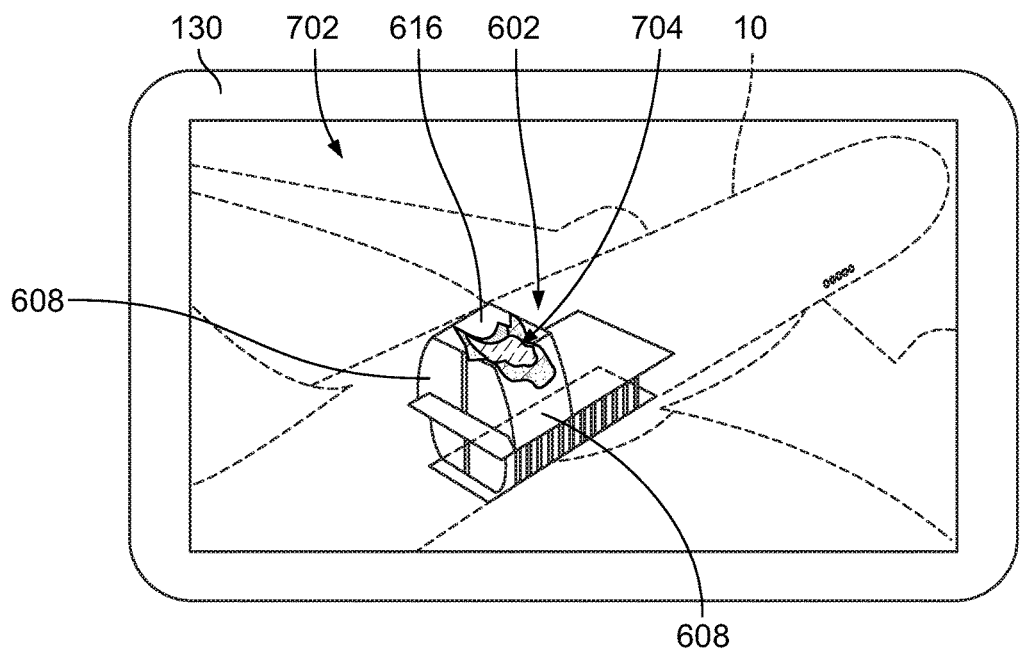
FIG. 7 illustrates a display device of the overheat detection system that is used to display a heat map according to an embodiment.

FIG. 7 illustrates a display device 130 of the overheat detection system 100 that is used to display a heat map 702 according to an embodiment. The heat map 702 may be a three-dimensional spatial heat map that displays calculated temperatures of one or more target objects within a confined space at specific locations relative to the confined space. In the illustrated embodiment, the heat map 702 is overlaid or embedded into a virtual representation of the aircraft 10, such as a wire-frame model of the aircraft 10. The aircraft 10 is shown in phantom, while the one or more cargo containers 608 in the cargo area 602 are more prominently displayed. In the illustrated embodiment, a hot spot 704 is shown in the heat map 702 along a top side 616 of the one or more containers 608, and the hot spot 704 may represent an overheat condition. The heat map 702 may provide information about the temperature of the hot spot 704 by depicting different colors and/or indicia to indicate temperature. The heat map 702 may be provide an operator, such as a flight crew, with information such that the location of the hot spot 704, the size of the hot spot 704, and the temperature of the hot spot, instead of merely alerting the crew that an overheat condition is detected. In an embodiment, the controller 106 may activate the alarm device 132 (FIG. 1) responsive to detecting the overheat condition, and may display the heat map 702 concurrently with activating the alarm device 132.

Although the embodiment shown in FIGS. 6 and 7 shows the overheat detection system 100 installed in the cargo area 602 of an aircraft 10, the overheat detection system 100 may alternatively or additionally be installed within one or more of the wheel wells 30 (shown in FIG. 5). For example, the sensing devices 102 may be mounted to walls of a wheel well 30 facing a landing gear wheel assembly that includes one or more wheels, brakes, and support arm. The sensing devices 102 may monitor the brakes to detect overheat conditions of the brakes. In other embodiments, the overheat detection system 100 may be installed in other confined spaces of the aircraft 10 or within other vehicles or industrial facilities.

Figure 8:
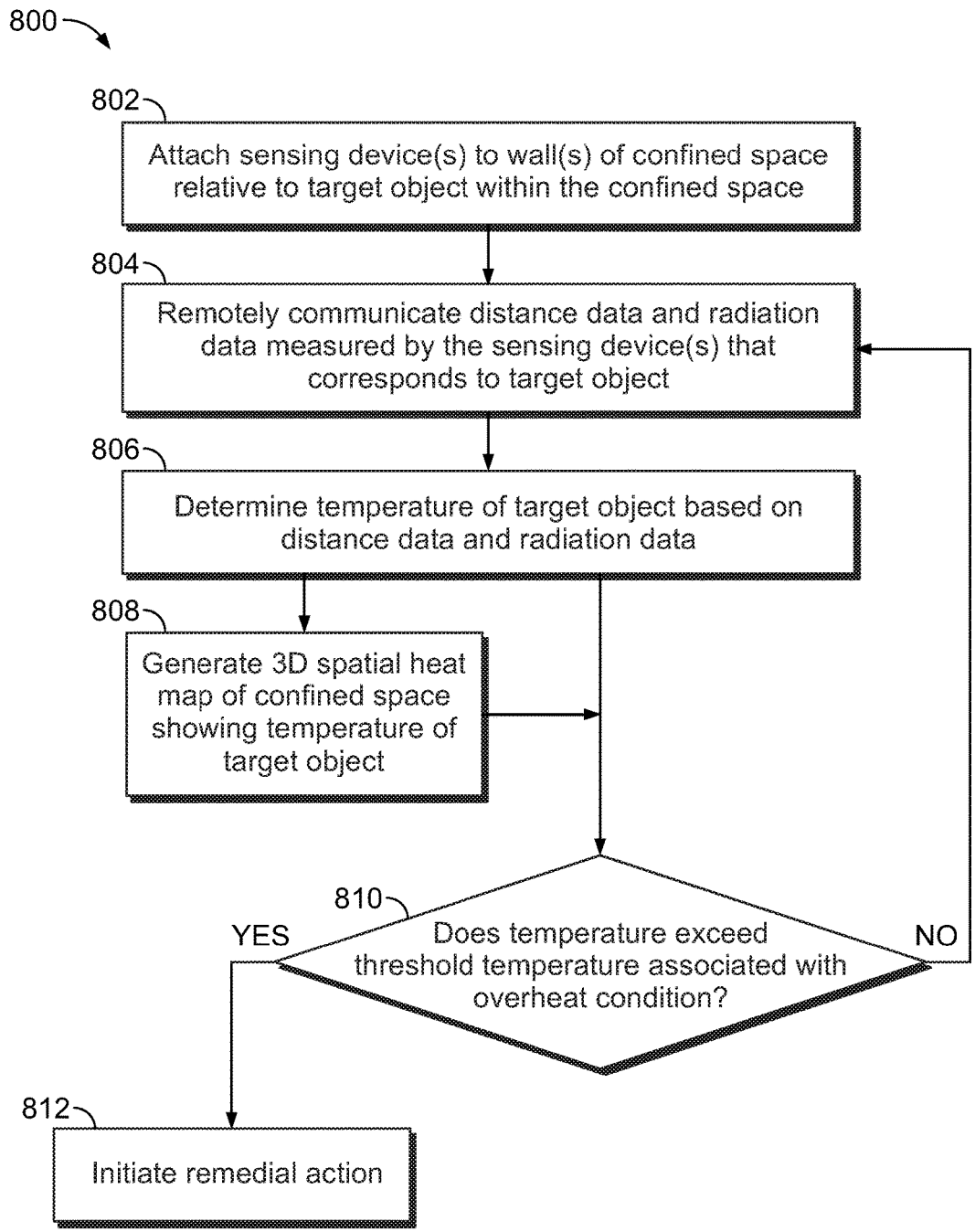
FIG. 8 is a flow chart of a method of detecting an overheat condition in a confined space according to an embodiment.

FIG. 8 is a flow chart of a method 800 of detecting an overheat condition in a confined space according to an embodiment. The method 800 may be performed by one or more of the embodiments of the overheat detection system 100 shown in FIGS. 1-7. At 802, one or more sensing devices are attached to a wall or walls of a confined space relative to one or more target objects within the confined space. The confined space may be within a vehicle, an industrial facility, or the like. The target object may be a cargo container, a brake system, an engine, a supply of batteries, or the like, that may be a risk for overheating. In an embodiment, multiple sensing devices are attached to the walls of the confined space at different locations relative to the target object. The sensing devices are configured to monitor the target object. For example, the sensing devices include laser range sensors configured to measure a distance of the target object from the respective sensing device and thermal imaging sensors configured to measure thermal radiation, such as IR radiation, emitted from the target object. The sensing devices optionally may be thin decals that are configured to be removably attached to the wall in order to allow an operator to selectively position the sensing devices within the confined space. Optionally, the sensing devices may measure other parameters, such as an ambient temperature in the confined space using an integrated temperature sensor.

At 804, the sensing devices are configured to remotely communicate distance data and radiation data collected by the sensing devices. The distance data represents the distances measured by the laser range sensors, and the radiation data represents the thermal radiation measured by the thermal imaging sensors. In addition to the distance data and radiation data, the sensing devices may also communicate additional information, such as the identity and position of the sensing device that collected the distance and radiation data, the ambient temperature measured by the sensing device, or the like. The data may be wirelessly communicated to a controller having one or more processors configured to analyze the data. In an embodiment, the sensing devices include RFID tags with antennas. The RFID tags may be passive such that the sensing devices communicate the distance and radiation data in a data signal in response to receiving an electrical activation signal from an RFID reader. The electrical activation signal energizes the RFID tags to enable the communication of the data signals. For example, although not shown in FIG. 8, the method 800 optionally includes wirelessly communicating an electrical activation signal from an RFID reader prior to 804, and the sensing devices may remotely communicate the data signals to the RFID reader at 804 in response to receiving the electrical activation signal.

At 806, the temperature of the target object is determined based on the distance data and the radiation data measured by the sensing devices. The one or more processors of the controller may determine the temperature using the measured IR radiation as a function of the distance between the target object and the sensing devices. Optionally, the one or more processors may utilize identification and position information from the sensing devices to determine the temperature at various different portions of the target object and/or the temperatures of multiple different target objects in the confined space.

At 808, a three-dimensional (3D) spatial heat map of the confined spaced is generated that shows the temperature of the target object. The heat map may be displayed on a display device that is viewable to one or more operators outside of the confined space. The heat map may provide information about detected hot spots in the target object, such as the location of the hot spot, the size of the hot spot, and the temperature of the hot spot. The generation of the heat map is optional, such that an alternative embodiment of the method 800 does not generate the heat map at 808. Upon generating the heat map, the method 800 proceeds to 810.

At 810, a determination is made whether the calculated temperature of the target object exceeds a threshold temperature associated with an overheat condition. The threshold temperature associated with the overheat condition may be designated based on various factors, such as the typical or expected temperature of the target object and the ambient temperature in the confined space. The overheat condition is associated with fire, although the overheat condition is broad and refers to both pre-ignition and post-extinguishment stages of a fire. The threshold temperature may be a temperature value within a range from about 35 degrees C. to about 100 degrees C. For example, if the threshold temperature is set as 50 degrees C., then if the determined temperature of the target object at 806 is greater than 50 degrees C., the flow of the method 800 continues to 812 and a remedial action is initiated. Alternatively, if the determined temperature of the target object is at or below the threshold temperature of 50 degrees C., then the flow of the method 800 returns to 804, in which addition distance and radiation data is remotely communicated by the sensing devices.

At 812, the remedial action that is initiated may include, but is not limited to, activating an alarm device to notify the operators of the detected overheat condition. The alarm device may provide a visual, audio, and/or tactile (e.g., vibrational) alert. The one or more processors may perform the remedial action automatically upon detection of the overheat condition. Other remedial actions that may be taken include displaying the heat map on the display device (as described in 808) to provide the location and other information about the overheat condition, notifying a control center remote from the confined space and the operators, and initiating a fire-suppression system within the confined space (e.g., spraying fire-retardant substances into the confined space, venting oxygen from the confined space, or the like).

Referring to FIGS. 1-8, embodiments of the present disclosure provide an overheat detection system and method. The embodiments of the system and method are configured to detect an overheat condition, such as the start of a fire, within a target object prior to known systems that rely on smoke detectors and have to wait until the smoke emits from the target object in order to detect a fire. The embodiments of the system and method are also configured to compensate automatically for different proximities of the target object or objects to the sensing devices by measuring both the thermal IR radiation emitted from the target object and the distance from the sensing device to the target object in combination with the calibration from a reference ambient temperature sensor, and factoring both parameters into the calculation to determine the temperature of the target object. As a result, the embodiments described herein may be more accurate than known systems that rely only on IR radiation measurements without adjusting for the distance between the target and the sensor. Furthermore, the sensing devices in the embodiments described herein may be configured to withstand high temperatures, may be removable for selective placement of the sensing devise relative to the target object, and may be able to provide information about a specific location of a detected hot spot in the confined space, rather than merely alerting of an overheat condition generally within the confined space. As a result, the embodiments of the system and method described herein may provide additional details about overheat conditions than are available using known systems, as well as improving the accuracy and shortening the detection-time, which allows for a quicker response time and more informed decision-making regarding which remedial actions to pursue.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for detecting an overheat condition in a confined space, the system comprising:
    a sensing device attached to a wall of the confined space, the sensing device including a laser range sensor, a thermal imaging sensor, a temperature sensor, and a wireless communication circuit, the laser range sensor configured to measure a distance from the sensing device to a target object within the confined space, the thermal imaging sensor configured to measure thermal radiation emitted from the target object, the temperature sensor configured to measure an ambient temperature within the confined space, the wireless communication circuit configured to remotely communicate distance data representing the distance measured by the laser range sensor, radiation data representing the thermal radiation measured by the thermal imaging sensor, and ambient temperature data representing the ambient temperature measured by the temperature sensor; and
    one or more processors configured to receive the distance data, the radiation data, and the ambient temperature data from the sensing device, the one or more processors configured to determine a temperature of the target object relative to the ambient temperature within the confined space based on the distance data, the radiation data, and the ambient temperature data.

2. The system of claim 1, wherein the sensing device is one of a plurality of sensing devices within the confined space, the sensing devices disposed at different locations within the confined space relative to the target object.

3. The system of claim 2, wherein the one or more processors are configured to determine the temperature of a first portion of the target object as a function of the thermal radiation emitted from the first portion of the target object that is measured by a first sensing device of the plurality of sensing devices and the distance of the first portion of the target object from the first sensing device.

4. The system of claim 1, wherein the wall of the confined space is a liner of a cargo area within a vehicle and the target object is a cargo container.

5. The system of claim 1, wherein the wall of the confined space is a wall of a wheel well within a vehicle and the target object is a wheel assembly of the vehicle.

6. The system of claim 1, wherein the sensing device is a removable decal having a flexible substrate.

7. The system of claim 6, wherein the flexible substrate is a heat-resistant fiber-based fabric.

8. The system of claim 1, wherein the wireless communication circuit on the sensing device is an RFID tag and the system further comprises an RFID reader configured to interrogate the RFID tag on the sensing device to receive the distance data, the radiation data, and the ambient temperature data from the sensing device, the RFID reader operatively connected to the one or more processors.

9. The system of claim 8, wherein the RFID tag of the sensing device is passive and is energized by an electrical activation signal received from the RFID reader, the RFID tag configured to communicate the distance data, the radiation data, and the ambient temperature data responsive to receiving the electrical activation signal.

10. The system of claim 1, wherein the one or more processors are configured to activate an alarm responsive to determining that the temperature of the target object exceeds a threshold temperature associated with an overheat condition.

11. The system of claim 1, wherein the one or more processors are configured to generate a three-dimensional spatial heat map of the confined space based on the temperature of the target object that is determined, the one or more processors configured to display the heat map on a display device.

12. The system of claim 1, wherein the sensing device includes a substrate that has a first side and a second side opposite the first side, the second side being attached to the wall of the confined space, the first side facing towards the target object within the confined space, wherein the temperature sensor, the thermal imaging sensor, and the laser range sensor are disposed on the first side of the substrate.

13. The system of claim 12, wherein the temperature sensor is represented by a first circuit component printed on the first side, the thermal imaging sensor is represented by a second circuit component printed on the first side, and the laser range sensor is represented by a third circuit component printed on the first side.

14. A method comprising:
receiving an electrical activation signal from an RFID reader at a sensing device attached to a wall of a confined space, the sensing device including a laser range sensor, a thermal imaging sensor, and a passive RFID tag including an antenna;
remotely communicating, via the antenna, distance data and radiation data from the sensing device to the RFID reader responsive to receiving the electrical activation signal, wherein the distance data represents a distance from the sensing device to a target object within the confined space as measured by the laser range sensor, and the radiation data represents a thermal radiation emitted from the target object as measured by the thermal imaging sensor;
determining, via one or more processors operatively connected to the RFID reader, a temperature of the target object based on the distance data and the radiation data communicated by the sensing device; and
initiating a remedial action responsive to determining that the temperature of the target object exceeds a threshold temperature associated with an overheat condition.

15. The method of claim 14, wherein the remedial action includes one or more of activating an alarm or venting the confined space to reduce the oxygen content within the confined space.

16. The method of claim 14, wherein the sensing device is one of multiple sensing devices disposed at different locations relative to the target object within the confined space, the method further comprising generating a three-dimensional spatial heat map of the confined space using the temperature of different portions of the target object based on the distance data and the radiation data measured by the multiple sensing devices, and displaying the heat map on a display device.

17. The method of claim 14, further comprising removably attaching the sensing device to the wall of the confined space.

18. A sensing device comprising:
a substrate having a first side and an opposite second side, the second side configured to be attached to a wall of a confined space, the first side facing towards a target object within the confined space, wherein the substrate is a flexible, heat-resistant, fiber-based fabric;
a thermal imaging sensor mounted on the substrate and configured to measure radiation data representing thermal radiation emitted from the target object;
a laser range sensor mounted on the substrate and configured to measure distance data representing a distance of the target object from the sensing device; and
a wireless communication circuit mounted on the substrate and configured to remotely communicate the distance data and the radiation data measured by the sensing device.

19. The sensing device of claim 18, wherein the wireless communication circuit is a passive RFID tag that includes an antenna, the wireless communication circuit configured to remotely communicate the distance data and the radiation data measured by the sensing device to an RFID reader responsive to receiving an electrical activation signal from the RFID reader.

20. The sensing device of claim 18, wherein a thickness of the substrate from the first side to the second side thereof is between above 0.2 cm and about 2 cm.

* * * * *